United States Patent
Shabtai et al.

(10) Patent No.: US 11,601,452 B2
(45) Date of Patent: *Mar. 7, 2023

(54) SYSTEM AND METHOD FOR ASSESSING CYBERSECURITY AWARENESS

(71) Applicant: Verint Systems Ltd., Herzliya (IL)

(72) Inventors: Asaf Shabtai, Hulda (IL); Rami Puzis, Ashdod (IL); Lior Rokach, Omer (IL); Liran Orevi, Rishon Lezion (IL); Genady Malinsky, Galil Maaravi (IL); Ziv Katzir, Even Yehuda (IL); Ron Bitton, Yehud (IL)

(73) Assignee: B.G. NEGEV TECHNOLOGIES AND APPLICATIONS LTD., Beer Sheva (IL)

( * ) Notice: Subject to any disclaimer, the term of this patent is extended or adjusted under 35 U.S.C. 154(b) by 72 days.

This patent is subject to a terminal disclaimer.

(21) Appl. No.: 16/658,797

(22) Filed: Oct. 21, 2019

(65) Prior Publication Data

US 2020/0053114 A1    Feb. 13, 2020

Related U.S. Application Data

(63) Continuation of application No. 15/291,331, filed on Oct. 12, 2016, now Pat. No. 10,454,958.

(60) Provisional application No. 62/239,991, filed on Oct. 12, 2015.

(51) Int. Cl.
| | |
|---|---|
| *H04L 9/40* | (2022.01) |
| *G06N 20/00* | (2019.01) |
| *G06F 21/55* | (2013.01) |

(52) U.S. Cl.
CPC ........ *H04L 63/1425* (2013.01); *G06F 21/552* (2013.01); *G06N 20/00* (2019.01); *H04L 63/1408* (2013.01); *H04L 63/1441* (2013.01); *G06F 2221/034* (2013.01)

(58) Field of Classification Search
CPC ............ H04L 63/1425; H04L 63/1441; H04L 63/1408; G06F 21/552; G06F 2221/034; G06N 20/00
See application file for complete search history.

(56) References Cited

U.S. PATENT DOCUMENTS

| | | | |
|---|---|---|---|
| 8,239,953 B1 | 8/2012 | Satish et al. | |
| 8,418,249 B1 | 4/2013 | Nucci et al. | |
| 8,615,807 B1 * | 12/2013 | Higbee | G06F 21/577 726/25 |

(Continued)

OTHER PUBLICATIONS

T. Sommestad, M. Ekstedt and P. Johnson, "Cyber Security Risks Assessment with Bayesian Defense Graphs and Architectural Models," 2009 42nd Hawaii International Conference on System Sciences, 2009, pp. 1-10, doi: 10.1109/HICSS.2009.141. (Year: 2009).*

(Continued)

*Primary Examiner* — Chau Le
(74) *Attorney, Agent, or Firm* — ISUS Intellectual Property PLLC; Anthony Jason Mirabito (57) ABSTRACT

Described embodiments include a system that includes a monitoring agent, configured to automatically monitor usage of a computing device by a user, and a processor. The processor is configured to compute, based on the monitoring, a score indicative of a cyber-security awareness of the user, and to generate an output indicative of the score.

19 Claims, 2 Drawing Sheets

(56) References Cited

U.S. PATENT DOCUMENTS

| | | | |
|---|---|---|---|
| 8,635,703 B1* | 1/2014 | Belani | G06F 21/00 |
| | | | 726/25 |
| 9,413,780 B1* | 8/2016 | Kaplan | G06F 21/577 |
| 2004/0250107 A1 | 12/2004 | Guo | |
| 2008/0271124 A1 | 10/2008 | Nisbet et al. | |
| 2009/0241168 A1* | 9/2009 | Readshaw | H04L 63/102 |
| | | | 726/3 |
| 2010/0031358 A1 | 2/2010 | Elovici et al. | |
| 2011/0131157 A1 | 6/2011 | Iyer et al. | |
| 2011/0131205 A1 | 6/2011 | Iyer et al. | |
| 2012/0258437 A1 | 10/2012 | Sadeh-Koniecpol et al. | |
| 2013/0198846 A1* | 8/2013 | Chapman | H04L 63/1483 |
| | | | 726/25 |
| 2015/0229664 A1* | 8/2015 | Hawthorn | H04L 63/1433 |
| | | | 726/25 |
| 2015/0248413 A1 | 9/2015 | Ratnavale | |
| 2015/0373039 A1 | 12/2015 | Wang | |
| 2016/0014151 A1 | 1/2016 | Prakash | |
| 2016/0156656 A1* | 6/2016 | Boggs | H04L 63/1425 |
| | | | 726/25 |
| 2016/0308897 A1* | 10/2016 | Chapman | H04L 63/1483 |
| 2016/0328380 A1 | 11/2016 | Yao et al. | |
| 2016/0328837 A1 | 11/2016 | He et al. | |
| 2016/0330238 A1* | 11/2016 | Hadnagy | H04L 63/1483 |

OTHER PUBLICATIONS

T. Sommestad, M. Ekstedtand H. Holm, "The Cyber Security Modeling Language: A Tool for Assessing the Vulnerability of Enterprise System Architectures," in IEEE Systems Journal, vol. 7, No. 3, pp. 363-373, Sep. 2013, doi: 10.1109/JSYST.2012.2221853. (Year: 2013).*

Albrechtsen, E., "A qualitative study of users' view on information security," Computers & Security, vol. 26, 2007, pp. 276-289.

Albrechtsen, E., et al., "Improving information security awareness and behavior through dialogue, participation and collective reflection. An intervention study," Computers & Security, vol. 29, 2010, pp. 432-445.

Common Vulnerability Scoring System (CVSS) v3.0: Specification Document (v1.7), First.Org. Inc., http://www.first.org/cvss/specification-document, 2015, 21 pages.

Common Vulnerability Scoring System v3.0: User Guide (v1.4), First.Org. Inc., http://www.first.org/cvss/user-guide, 2015, 15 pages.

Da Veiga, A., et al., "A framework and assessment instrument for information security culture," Computers & Security, vol. 29, 2010, pp. 196-207.

Fire, M., et al., "Link Prediction in Social Networks using Computationally Efficient Topological Features," IEEE Third International Conference on Privacy, Security, Risk and Trust (PASSAT) and IEEE Third International Conference on Social Computing (SocialCom), 2011, 8 pages.

Fisher, D., et al., "Short Paper: Location Privacy: User Behavior in the Field," Proceedings of the second ACM workshop on Security and privacy in smartphones and mobile devices, ACM, 2012, 6 pages.

Gafny, M., et al., "OCCT: A One-Class Clustering Tree for One-to-Many Data Linkage," IEEE Transactions on Knowledge and Data Engineering (TKDE), 2013, 16 pages.

Ion, I., "Influence of User Perception, Security Needs, and Social Factors on Device Pairing Method Choices," Proceedings of the Sixth Symposium on Usable Privacy and Security. ACM, 2010, 3 pages.

Kruger, H.A., et al., "A Framework for Evaluating ICT Security Awareness," ISSA, 2006, 11 pages.

Kruger, H.A., et al., "A prototype for assessing information security awareness," Computers & Security, vol. 25, 2006, pp. 289-296.

Lévesque, F.L., et al., "A Clinical Study of Risk Factors Related to Malware Infections," Proceedings of the 2013 ACM SIGSAC conference on Computer & communications security, ACM, 2013, 12 pages.

Measuring Security Awareness Program Results, SANS, http://www.securingthehuman.org/resources/metrics, 2016, 1 page.

Mylonas, A., et al. "A qualitative metrics vector for the awareness of smartphone security users," Trust, Privacy, and Security in Digital Business, Springer-Verlag Berlin Heidelberg, 2013, pp. 173-184.

Mylonas, A., et al., "Delegate the Smartphone User? Security Awareness in Smartphone Platforms," Computers & Security, vol. 34, 2013, pp. 47-66.

Shabtai, A., et al., "Andromaly: A behavioral malware detection framework for android devices," Journal of Intelligent Information Systems, vol. 38, No. 1, 2012, pp. 161-190.

Shabtai, A., et al., "Intrusion detection for mobile devices using the knowledge-based, temporal abstraction method," The Journal of Systems and Software, vol. 83, No. 8, 2010, pp. 1524-1537.

Tenenboim-Chekina, L., et al., "Detecting Application Update Attack on Mobile Devices through Network Features," In Proceedings of the 32nd IEEE International Conference on Computer Communications (INFOCOM 2013), Turin, Italy, Apr. 14-19, 2013, 2 pages.

Thomson, M.E., et al., "Information security awareness: educating your users effectively," Information Management & Computer Security, vol. 6, No. 4, 1998, pp. 167-173.

Tsohou, A., et al., "Analyzing Information Security Awareness through Networks of Association," Trust, Privacy and Security in Digital Business, Lecture Notes in Computer Science, Springer-Verlag Berlin Heidelberg, 2010, pp. 227-237.

Weiss, Y., et al., "The CASH algorithm-cost-sensitive attribute selection using histograms," Information Sciences, Elsevier, vol. 222, 2013, pp. 247-268.

Wolf, M., et al., "Measuring An Information Security Awareness Program," Review of Business Information Systems, vol. 15, No. 3, 2011, 13 pages.

Extended European Search Report and Written Opinion, dated Feb. 14, 2017, received in connection with EP Patent Application No. 16193569.7.

* cited by examiner

SYSTEM AND METHOD FOR ASSESSING CYBERSECURITY AWARENESS

CROSS-REFERENCE TO RELATED APPLICATIONS

The present application is a continuation of U.S. Non-Provisional application Ser. No. 15/291,331, entitled "System and Method for Assessing Cybersecurity Awareness," filed Oct. 12, 2016, and claims the benefit of U.S. Provisional Application 62/239,991, entitled "Method and system for automatic, non-disruptive, inference of the security awareness level of users by analyzing host and network traffic observations," filed Oct. 12, 2015, the disclosures of which are incorporated herein by reference in their entireties.

FIELD OF THE DISCLOSURE

The present disclosure relates to the field of cyber-security.

BACKGROUND OF THE DISCLOSURE

Users of computing devices have varying levels of cyber-security awareness, such that some users are more vulnerable than others to attacks.

In some cases, a corporation may wish to assess the security awareness of its employees, in order to better assess any risks to which the corporation is exposed.

SUMMARY OF THE DISCLOSURE

There is provided, in accordance with some embodiments described herein, a system that includes a monitoring agent, configured to automatically monitor usage of a computing device by a user, and a processor. The processor is configured to compute, based on the monitoring, a score indicative of a cyber-security awareness of the user, and to generate an output indicative of the score.

In some embodiments, the monitoring agent includes a network probe configured to monitor the usage of the computing device by monitoring network traffic exchanged with the computing device.

In some embodiments, the monitoring agent includes a software agent installed on the computing device.

In some embodiments, the processor is configured to compute the score by:

recommending a simulated cyber-security attack, and computing the score, based on a response of the user to the simulated attack.

In some embodiments, the processor is further configured to receive an input that includes a type of cyber-security attack, and the processor is configured to compute the score such that the score is indicative of the awareness of the user with respect to the type of attack.

In some embodiments, the processor is configured to compute the score by:

computing, based on the monitoring, a characteristic vector of coefficients, each of which quantifies competence of the user in a different respective one of a plurality of cyber-security areas, and computing the score, based on the characteristic vector of coefficients, and respective weightings of each of the coefficients with respect to the type of attack.

In some embodiments, the processor is configured to compute the score by computing, using the weightings, a weighted sum of the coefficients.

In some embodiments, the processor is configured to use a machine-learned model to compute the characteristic vector of coefficients.

There is further provided, in accordance with some embodiments described herein, a system that includes an information repository and a processor. The processor is configured to retrieve, from the information repository, information regarding network traffic exchanged with a computing device of a user, to compute, based on the information, a score indicative of a cyber-security awareness of the user, and to generate an output indicative of the score.

There is further provided, in accordance with some embodiments described herein, a method that includes, using a monitoring agent, automatically monitoring usage of a computing device by a user. The method further includes, based on the monitoring, computing a score indicative of a cyber-security awareness of the user, and generating an output indicative of the score.

In some embodiments, computing the characteristic vector of coefficients includes computing the characteristic vector of coefficients by mapping a plurality of features, obtained from the monitoring, to the coefficients.

In some embodiments, the method further includes, prior to computing the characteristic vector:

using the monitoring agent, by monitoring at least one user, obtaining a first plurality of features, by monitoring the at least one user using a monitoring technique that is not used by the monitoring agent, obtaining a second plurality of features, and calibrating the mapping such that a characteristic vector of coefficients mapped from the first plurality of features is within a threshold of similarity of a characteristic vector of coefficients mapped from the second plurality of features.

In some embodiments, the method further includes, prior to computing the characteristic vector, calibrating the mapping, by:

using characteristic vectors of coefficients obtained from the mapping, computing respective scores, for a plurality of users, that indicate awareness of the users with respect to a particular type of cyber-security attack, and checking a correlation between the scores and respective responses of the users to a simulated attack of the particular type.

The present disclosure will be more fully understood from the following detailed description of embodiments thereof, taken together with the drawings, in which:

DETAILED DESCRIPTION OF EMBODIMENTS

Overview

As described above, a proper assessment of security awareness may be an important ingredient in effective cyber-risk management. In addition, an assessment of a user's security awareness may be used to guide the training of the user in "safe" cyber habits, in any suitable setting.

It is generally challenging to objectively assess security awareness. Contributing to the challenge is the fact that a user's level of security awareness cannot usually be described by a single number or label. Rather, security awareness has multiple dimensions, relating to different respective types (or "families") of attacks. For example, a given user may be relatively careful with respect to phishing attacks, but blissfully unaware of the dangers of password theft.

One way to assess the security awareness of a user is to evaluate the answers provided by the user to a security-related questionnaire. A problem with this approach, however, is that the approach requires the active participation of the user. Moreover, the user's answers may not truly reflect the user's knowledge and behavior. (For example, the user may not know or remember all of the relevant facts, and/or may be unwilling to admit problematic behaviors.) Additionally, a given user will typically agree to respond to a questionnaire only on occasion, such that it may be difficult to achieve a continually up-to-date assessment. Furthermore, it is difficult to implement this approach for a large number of users, such as in large corporations.

Embodiments described herein therefore provide a superior technique for assessing the security awareness of a user, based on automatic monitoring of network traffic exchanged with the user (i.e., network traffic that originates or terminates at the user's device). Based on features extracted from the traffic—such as the number of web ads clicked on by the user, the number of links in spam emails clicked on by the user, or properties of websites visited by the user—a processor automatically assigns, to the user, a score that is specific to a given attack-type of interest. For example, the processor may assign, to the user, a score of 8.5/10 for phishing attacks, based on the degree to which the user's network traffic reflects an awareness of phishing attacks. This technique does not require the user's active participation, and generally provides an objective assessment of the user's security awareness. Moreover, the user's traffic may be monitored continually (or continuously), such as to achieve a continually (or continuously) up-to-date score.

Typically, in assigning the score, a machine-learned model is first used to map the extracted features to a characteristic vector of coefficients, each of these coefficients quantifying the user's competence, i.e., the user's knowledge and/or behavior, in a different respective cyber-security area. Generally, the characteristic vector is comprehensive, covering all of the security-related areas of behavior and/or knowledge that are deemed to be relevant to security awareness; in other words, each relevant area of behavior and/or knowledge is represented in the characteristic vector. Subsequently, a score is assigned to the user for an attack-type of interest, based on the characteristic vector, and a weighting of each of the coefficients with respect to the attack-type of interest.

For example, based on observing, in the user's network traffic, a download of antivirus software, the machine-learned model may assign a high "antivirus" coefficient to the user, indicating that the user utilizes proper antivirus protection. Subsequently, the user may be assigned a high score (indicating a high level of awareness) for malware-related attacks, based on the user's high "antivirus" coefficient, which has a strong weighting for malware-related attacks, as well as, if relevant, other coefficients in the user's characteristic vector that are relevant to malware-related attacks.

Since a characteristic vector describes, quantitatively, the character of a user, and is thus abstracted from the features that were used to compute the characteristic vector, the characteristic vector may be flexibly used in assessing the awareness of the user to any attack-type of interest. For example, the user's awareness with respect to a new type of attack may be assessed, without necessarily extracting any features that were not heretofore extracted, and without necessarily learning a direct relationship between the extracted features and the new type of attack. Rather, it may be sufficient to quantify—e.g., based on expert opinion—the weightings that quantify the relationship between the vector coefficients and the new attack type.

Moreover, any suitable monitoring technique may be used to derive the user's characteristic vector. For example, alternatively or additionally to monitoring a user's network traffic, a software agent, installed on the user's computing device (e.g., by an information-technology administrator), may monitor the user's usage of the device, and features obtained from this monitoring may then be mapped, e.g., using a machine-learned model, to the coefficients of the user's characteristic vector.

Embodiments described herein also include a calibration procedure, which calibrates the mapping of features to the coefficients of the characteristic vector. This calibration procedure promotes an accurate mapping, by harmonizing a plurality of mappings that are based on different respective monitoring techniques, and/or by performing simulated attacks on users and verifying that the users' responses to the attacks correlate with the users' security-awareness scores.

System Description

Figure 1:
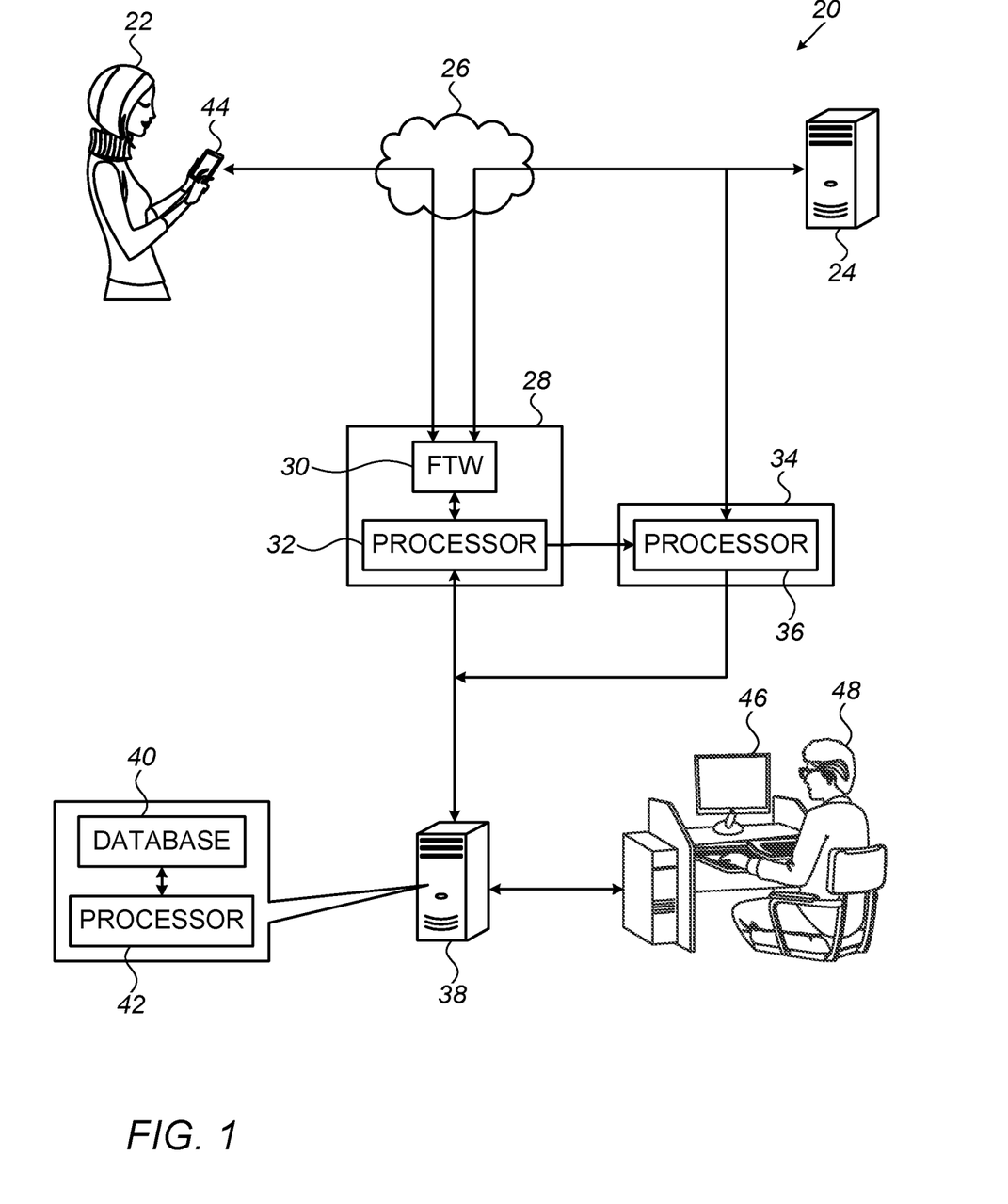
FIG. 1 is a schematic illustration of a system for assessing security awareness of a user, in accordance with some embodiments of the present disclosure.

Reference is initially made to FIG. 1, which is a schematic illustration of a system 20 for assessing security awareness of a user 22, in accordance with some embodiments of the present disclosure. As user 22 uses a network-enabled computing device, such as a smartphone 44, to communicate over a network 26, such as the Internet, system 20 automatically monitors the user's usage of the device, by monitoring the network traffic exchanged with the device. As described in detail below, based on the monitoring, system 20 computes a score that indicates the cyber-security awareness of the user, in that this score quantifies the user's susceptibility to cyber-security attacks. Following the computation of the score, the system generates an output indicative of the score.

In general, system 20 may monitor user 22 over any suitable period of time, until the system has gathered sufficient data for computing an awareness score with a reasonable level of confidence. The monitored traffic may be from communication exchanged with a remote server 24, for example, and/or with any other remote computing device, such as another smartphone.

System 20 comprises a monitoring agent, comprising, for example, one or more network probes, configured to monitor network traffic exchanged with the user's computing device. For example, system 20 may comprise a network tap 34, comprising a processor 36. Network traffic exchanged with user 22 is received by network tap 34. For example, an Internet service provider (ISP) may provide mirrored flows of the network traffic to the network tap, and/or the network tap may receive mirrored flows from an inline probe 28, described below.

Processor 36 processes the received network traffic. In particular, processor 36 extracts relevant features from the network traffic, these features being subsequently used by system 20 to generate a score for the user. In general, each of the features extracted by processor 36 may be an elementary observation, such as a total number of DNS queries during a particular period of time, or, alternatively, a function of such elementary observations, such as a ratio of a number of visits to suspicious websites to a total number of website visits. (For simplicity, the present application does not distinguish between an "observation" and a "feature," such that the scope of each of these terms includes both elementary observations and functions thereof.) Network tap 34 is typically passive, in that the network tap typically does not modify the flow of traffic through network 26.

Examples of features extracted by network tap 34 include the types, variety, and/or configuration of protective software installed on the user's device, the timing of updates to such protective software, the number and/or nature of downloads of illegal software (e.g., cracks or keygens) and/or downloads from untrusted sites, the type and/or version of the operating system (OS) installed on the user's device, whether the OS is genuine or cracked, whether the OS has been updated with the latest service packs, the number of source internet protocol (IP) addresses from which the user has communicated, whether the user utilizes a firewall or other type of network protection, whether the user uses secured connections (e.g., via virtual private networks), the respective trust levels and/or categories of websites visited by the user, the number of ads on which the user has clicked, the number of approvals of untrusted certificates or the trustworthiness of approved certificates, the type, version, and/or configuration of the web browser used by the user, the number of cookies received by the user, the user's frequency in deleting cookies and/or the user's browsing history, the number of browser add-on installations performed by the user, and the respective types or reputations of, or the diversity of, websites visited by the user. Each of these features reflects an aspect of the user's security-awareness level. (It is emphasized that the above list of features is not exhaustive, and is provided by way of example only.)

In general, the ability of the network tap to extract a particular feature may vary over time, as a function of network conditions and/or technological evolution. The ability to extract a particular feature may further depend on whether the received traffic is encrypted. In general, however, at least some features—e.g., the trustworthiness of approved certificates—may be extracted, regardless of whether the traffic is encrypted.

In some embodiments, system 20 alternatively or additionally comprises an inline probe 28. In contrast to the network tap, inline probe 28 is active, such that the inline probe may modify the traffic flow; for example, as further described below, the inline probe may pass simulated cyber-security attacks to the user. Inline probe 28 comprises a fail-to-wire (FTW) 30, which allows network traffic to pass through in case of a malfunction, and a processor 32. Most received network traffic passes, unaltered, through the inline probe; some received network traffic, however, is modified by processor 32, prior to being passed along through the network.

Examples of simulated attacks, which may be performed by the inline probe, include the sending of phishing messages, the insertion of redirection commands or popups into Hypertext Transfer Protocol (HTTP) responses, certificate injections, and attempts to install an application on the user's device.

System 20 further comprises an information repository, such as a database 40, configured to store information regarding usage of the user's device, and a processor 42, configured to compute a score for the user based on this information. For example, features received from the network tap may be stored in database 40, and subsequently retrieved by processor 42. Processor 42 may then process the features, such as to compute a score for the user, and may then generate an output that indicates the score. Alternatively or additionally, the processor may recommend a simulated cyber-security attack, and compute the score based on the response of the user to the simulated attack. Such a simulated attack may be implemented by processor 42, via inline probe 28, as described above. Typically, database 40 and processor 42 are located on a server 38.

In some embodiments, the network tap does not extract features from the received network traffic. Rather, the network tap passes the received network traffic to processor 42, and processor 42 then extracts features from the network traffic.

As noted above, there is typically no single score that indicates the awareness of a user to all relevant types of attacks. Hence, processor 42 is typically configured to compute attack-type-specific scores. In some embodiments, for example, processor 42 receives, from a monitoring person 48, an input that includes a type of cyber-security attack, and, in response to this input, processor 42 computes a score that is indicative of the awareness of the user with respect to the type of attack. In some cases, the input to processor 42 may include a plurality of attack types, and processor 42 may, in response thereto, compute a plurality of scores corresponding, respectively, to the various attack types.

In general, the score computed by processor 42 may be quantitative (e.g., 8.0/10), or qualitative (e.g., "medium awareness"). Typically, the output generated by processor 42 is a visual output. For example, the processor may display the score on a display 46, for viewing by monitoring person 48.

The configuration of system 20 shown in FIG. 1 is an example configuration that is depicted purely for the sake of conceptual clarity. In alternative embodiments, any other suitable configurations can be used.

In general, each of processor 32, processor 36, and processor 42 may be embodied as a single processor, or as a cooperatively networked or clustered set of processors. Typically, at least one of these processors (e.g., processor 32 and/or processor 36) is implemented solely in hardware or embedded software, e.g., using one or more Application-Specific Integrated Circuits (ASICs) or Field-Programmable Gate Arrays (FPGAs). In general, however, any one or more of these processors may be at least partly implemented in software. Such a software-implemented processor is typically a programmed digital computing device comprising a central processing unit (CPU), random access memory (RAM), non-volatile secondary storage, such as a hard drive or CD ROM drive, network interfaces, and/or peripheral devices. Program code, including software programs, and/or data are loaded into the RAM for execution and processing by the CPU and results are generated for display, output, transmittal, or storage, as is known in the art. The program code and/or data may be downloaded in electronic form, over a network, for example, or they may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

Mapping Features to a Characteristic Vector

In some embodiments, processor 42 computes a score directly from the features that were obtained from monitoring the user's usage of the user's computing device. Typically, however, as described above, processor 42 first computes a characteristic vector of coefficients based on the features, by mapping the features to the coefficients, and then computes the score from the characteristic vector. (In the context of the present application, including the claims, the term "coefficient" is used to broadly indicate any number that is used to quantify a particular property or characteristic.) As described above, each of the coefficients quantifies the competence of the user in a different respective one of a plurality of cyber-security areas, which collectively span all of the security-related areas that are deemed to be relevant to security awareness. For example, the entire "cyber-security universe" may be divided generally into the categories of "protection," "applications," "privacy," "networks," and "web-surfing," and these categories may be further divided into a plurality of subcategories, to which the coefficients respectively correspond. For example, each one of the coefficients may quantify a respective one of the following areas of competence.

A. Within the Category of "Protection"
  (i) The user's knowledge and technical skill in securing sensitive information
  (ii) The user's use of protective software such as antivirus software
  (iii) The absence of viruses and security-related warnings on the user's device Example features, relating to this category, which may be extracted from the user's network traffic, include evidence of antivirus updates, ad blockers, and personal firewalls.

B. Within the Category of "Applications"
  (iv) The user's prudence in downloading of information and/or software from suspect sources
  (v) The user's prudence in granting permissions to applications
  (vi) The degree to which the user's software is up-to-date
  (vii) Whether the user's device is rooted Example features, relating to this category, which may be extracted from the user's network traffic, include a number of applications used, versions of installed applications, auto-update network activity, and evidence of installed applications that are known to be available only for rooted devices.

C. Within the Category of "Privacy"
  (viii) The degree to which the user shares personal information online
  (ix) The user's knowledge and ability in protecting password and identify theft Example features, relating to this category, which may be extracted from the user's network traffic, include patterns that appear to be credentials or passwords delivered in an unencrypted manner, and evidence of a particular username being used for multiple applications.

D. Within the Category of "Networks"
  (x) The user's prudence in communicating over an insecure network Example features, relating to this category, which may be extracted from the user's network traffic, include a ratio of a volume of unencrypted traffic to a volume of encrypted traffic.

E. Within the Category of "Web-Surfing"
  (xi) The degree to which the user surfs
  (xii) The degree to which the user interacts with spam email
  (xiii) The user's prudence in visiting websites with malicious content Example features, relating to this category, which may be extracted from the user's network traffic, include the Uniform Resource Locators (URLs) visited by the user, whereby additional tools may be used to assess the respective categories and/or reputations of these URLs.

The characteristic vector is typically standardized, such that the competence of each user assessed by the processor is quantified with respect to the same areas of cyber-security. Typically, these areas are defined in advance, by a group of cyber-security experts.

As a partial example of a mapping to a characteristic vector, it will be assumed that the network traffic of a user was observed to contain: (i) a large number of Domain Name System (DNS) queries, including several for suspicious-looking domain names, and (ii) several antivirus software updates. In response to these observations, the processor may assign, to the user, a relatively high coefficient, indicating a relatively high level of competence, for area (ii) (the user's use of protective software such as antivirus software), and/or area (vi) (the degree to which the user's software is up-to-date), but a relatively low coefficient for area (xi) (the degree to which the user surfs), and/or area (xiii) (the user's prudence in visiting websites with malicious content). Thus, for example, assuming each coefficient is on a scale of 0 to 10, the user might be assigned the following characteristic vector: (5, 9.2, 7, 4, 5.2, 8.5, 5.5, 3.1, 4, 6, 1, 4.5, 1.5). In this vector, the second and sixth coefficients, corresponding, respectively, to areas (ii) and (vi), are relatively high, while the eleventh and thirteenth coefficients, corresponding, respectively, to areas (xi) and (xiii), are relatively low.

The vector computed by processor 42 is "characteristic" to each user, in the sense that the vector quantitatively describes the character of the user, by quantifying the user's cyber-security-related knowledge, abilities, and/or behavioral tendencies. As further described below with respect to the calibration process, the computation of the characteristic vector is typically calibrated such that the characteristic vector is not dependent on the properties of a particular network, device, or monitoring technique. For example, as further described below, features obtained from several different monitoring techniques may map to approximately the same coefficients, for a given user. Hence, typically, the characteristic vector is an objective description of the user's competence that may be derived by monitoring usage of the user's device in any suitable manner.

As an example of an alternative method of monitoring usage of the user's device, system 20 may comprise a software agent installed on the user's device, configured to monitor usage of the device. In other words, system 20 may comprise a software module, running on the processor of the user's computing device, that acts as a monitoring agent, by instructing the processor of the user's computing device to gather and report relevant features regarding usage of the device. Examples of such features include the number of software updates initiated or approved by the user, the number of applications installed on the user's device, whether the device's operating system is up-to-date, or whether the device is rooted. In such embodiments, the user's characteristic vector may be computed, by processor 42, from features, such as those listed above, obtained by the software agent.

An advantage of using a software agent, as described above, is that the software agent may have access to information that cannot be directly observed in the user's network traffic. Moreover, features obtained by such an agent may be more directly related to the competence areas that are quantified by the characteristic vector, relative to the features obtained by monitoring the user's network traffic.

Nonetheless, to facilitate monitoring the user without the user's active involvement, monitoring the user's network traffic may be preferred to the use of a software agent. In any case, as described above, the values of the coefficients in the characteristic vector are generally not dependent on the type of monitoring technique that is used.

Using a Characteristic Vector to Compute a Score

Based on the characteristic vector, processor 42 computes a security-awareness score for the user. Typically, as described above, the score is computed such that the score is indicative of the awareness of the user with respect to a specific type of attack. The processor receives, as input, the type of attack, along with respective weightings of each of the coefficients with respect to the type of attack. Each of these weightings quantifies the importance, or relevance, of the corresponding coefficient, and corresponding security-related area, to the type of attack. Thus, for example, the coefficient for area (xii) above (the degree to which the user interacts with spam email) may be given a relatively high weighting for a phishing attack, but a lower weighting for another type of attack that does not utilize spam email. Typically, the processor is provided with a vector of weightings for the particular type of attack, whereby each of the weightings corresponds to a respective one of the coefficients in the characteristic vector. This weighting vector is then used to compute a score by aggregating the coefficients. For example, the weighting vector may be used to compute a weighted sum of the coefficients.

For example, assuming the thirteen cyber-security areas listed above, the processor may be provided with the following thirteen-element vector of weightings, for a given type of attack: (0.1, 0, 0.2, 0.15, 0.2, 0, 0.05, 0.05, 0.1, 0, 0.1, 0.05, 0). The inner product of this vector with the characteristic vector may then be computed, producing, as the score, a weighted sum of the characteristic-vector coefficients. For example, assuming the example characteristic vector and weighting vector above, the score would be 0.1×5+0.2×7+0.15×4+0.2×5.2+0.05×5.5+0.05×3.1+0.1×4+ 0.1×1+0.05×4.5=4.695. Given that the weighting vector sums to one, and the coefficients are on a scale of 0 to 10, this score is also on a scale of 0 to 10. Hence, being approximately equal to 5, this score indicates that the user has a medium level of awareness with respect to the given attack type.

Typically, the weightings for any particular attack type are set by one or more experts, e.g., using the analytic hierarchy process (AHP). For example, each expert may be asked a series of questions, each of which has the canonical form "Competence in which of the following two cyber-security areas is more important for identifying attack type XYZ—Area ABC, or Area DEF?" Based on the experts' answers to these questions, the weightings may be calculated.

It is noted that the above-described input is not necessarily received, by the processor, in real-time; rather, prior to any specific user being targeted for monitoring, the processor may be provided with one or more attack-types of interest, and/or vectors of weightings for one or more attack-types of interest, which the processor may then use to compute one or more scores for any user of interest.

Typically, for each score computation, the processor computes a level of confidence with which the score was computed. This confidence level typically takes into account the duration over which the user was monitored; the longer the duration, the higher the confidence level. Other factors that may influence the confidence level include the number and quality of features identified in the traffic, and the degree to which these features agree with, or conflict with, each other.

To increase the confidence level of a score, and/or decrease the monitoring duration, processor 42 may recommend a simulated cyber-security attack, and then compute the score based on the response of the user to the simulated attack. For example, to compute a score for phishing attacks, the processor may recommend a simulated phishing attack in which the user is presented with a fake phishing email that presents the user with a link to a site at which the user is asked to provide sensitive information. (As described above, the processor may also perform such a simulated attack, via inline probe 28.) The user's response to this simulated attack—i.e., whether the user clicks on the link, and if so, whether the user enters the sensitive information—may then affect the computation of the score. Alternatively or additionally, the processor may recommend the acquisition of additional features which, if acquired, would increase the confidence level of the score.

As described above, an advantage of embodiments described herein is that it is not necessary to learn a direct relationship between the extracted features and every given attack-type of interest. Rather, the mapping from features to characteristic vector may be learned once (e.g., during the calibration procedure described below), and subsequently, the characteristic vector may be used to compute a score for any type of attack, provided that the weighting vector for the type of attack is available.

Typically, the processor may operate in either an "online" mode or an "offline" mode, for any given user. In the online mode, the processor begins to output a range of scores, within a short period of time (e.g., within one hour) of the user beginning to be monitored. As time continues, and more data from the user are received, the range of scores becomes tighter, until the user's score converges to a single value. In general, the size of the range is a function of the confidence level of the score calculation; the higher the confidence, the smaller the range. For example, after one hour of monitoring, and hence, relatively little network traffic received, the processor may output a relatively large range for the user's score, such as 2-8. After another hour, the range may become tighter, e.g., the range may become 2.3-7.9. Over time, the range may continue to become even tighter, until the score converges to a single value, such as 6, for example. (In the event that the score does not converge, or is converging too slowly, a simulated cyber-attack may be performed, as described above.) In contrast, in the offline mode, the processor waits until sufficient data have been gathered, such that the confidence level of the score calculation is relatively high, and only then outputs a score for the user.

Calibration

In some embodiments, during a calibration procedure, processor 42 calibrates the mapping from features to characteristic vector. Typically, such a calibration involves using a machine-learning algorithm, such as the random forest algorithm or an artificial neural network, to learn, and subsequently refine, a model, which may be subsequently used to compute characteristic vectors based on input features.

In some embodiments, during calibration, the monitoring agent (i.e., the network probe or software agent) belonging to system 20 is used to obtain a first plurality of features, by monitoring at least one user. At least one other monitoring technique, which is not used by the monitoring agent, is also used to monitor the at least one user, and a second plurality of features are obtained from this monitoring. The mapping is then calibrated such that the characteristic vector of coefficients mapped from the first plurality of features is within a threshold of similarity of the characteristic vector of coefficients mapped from the second plurality of features.

For example, assuming the mapping from features to characteristic vectors is performed by a machine-learned model, the processor may learn a plurality of models, configured to compute characteristic vectors based, respectively, on a plurality of monitoring techniques. The processor may then adjust the models, until the characteristic vectors from the different models converge to each other. The convergence of the characteristic vectors indicates that the characteristic vectors are not dependent on the monitoring technique that is used, but rather, are objective quantifications of users' levels of competence.

For example, three monitoring techniques may be used to monitor a plurality of users: monitoring of network traffic (as described above), monitoring using a software agent (as described above), and monitoring by obtaining answers to a cyber-security-related questionnaire. (A given user is not necessarily monitored using all three of the techniques.) The processor may thus receive a plurality of features from each of the monitoring techniques. Each of these pluralities of features may then be used to learn a respective model. The models may then be calibrated, via an iterative process of refinement, such that, for any one of the users, the characteristic vector computed by any one of the models is within a threshold of similarity of the characteristic vector of coefficients computed by any other one of the models.

Alternatively or additionally, the model that is to be subsequently used for scoring—e.g., the model that maps network-traffic features to characteristic vectors—may be used to compute respective characteristic vectors of coefficients for a plurality of users. These characteristic vectors may then be used to compute, for each of these users, respective scores that indicate awareness of the user with respect to particular types of cyber-security attacks. The processor may then evaluate the correlation between the scores and respective responses of the users to simulated attacks of the particular types. A strong correlation indicates that the model is accurate.

Figure 2:
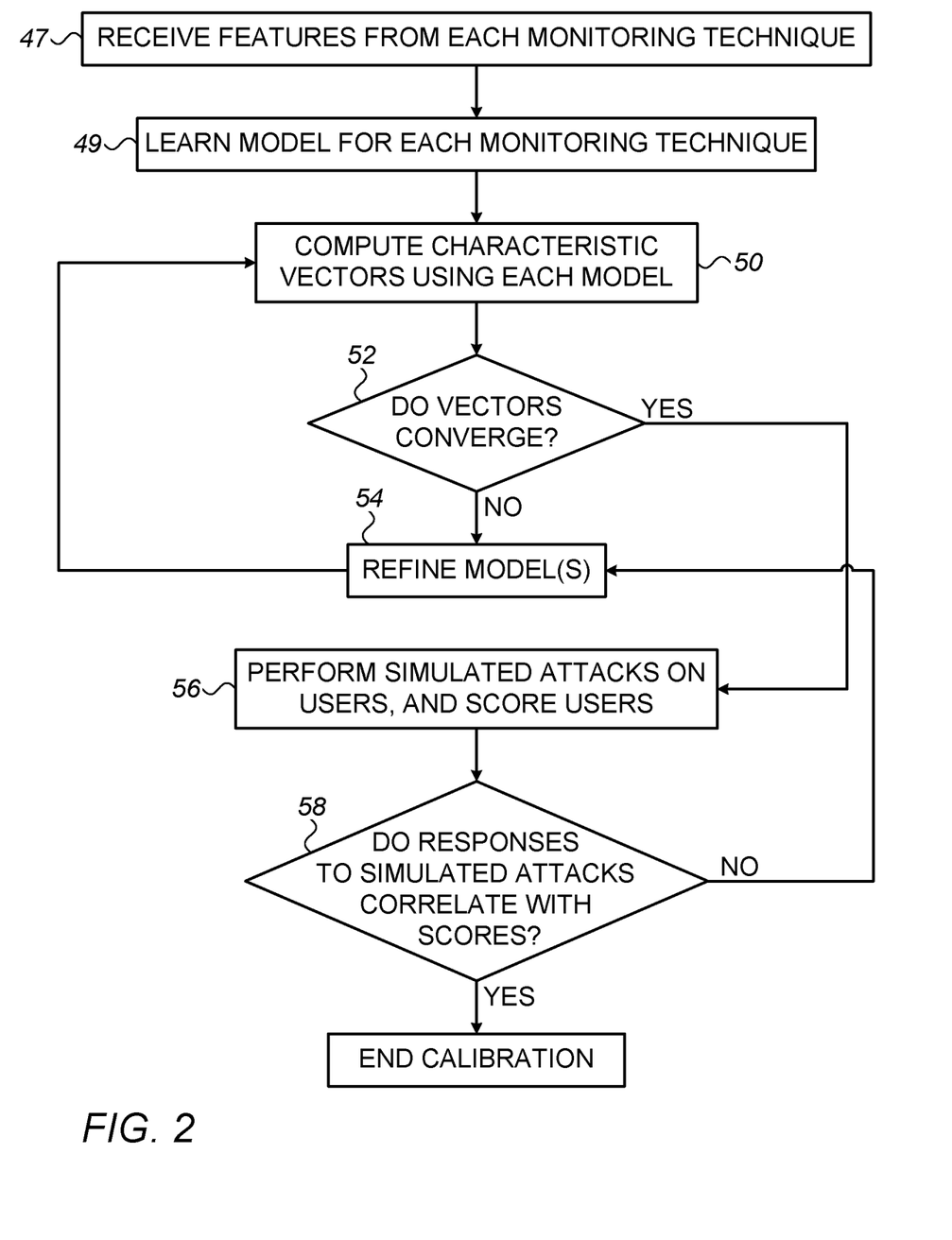
FIG. 2 is a flow diagram for a calibration procedure, in accordance with some embodiments of the present disclosure.

The above-described calibration procedure will now be described, in more detail, with reference to FIG. 2, which is a flow diagram for a calibration procedure, in accordance with some embodiments of the present disclosure.

First, at a feature-receiving step 47, the processor receives several sets of features, each set of features being obtained from monitoring a plurality of users using a different respective monitoring technique. Subsequently, based on the received features, the processor learns, at a learning step 49, a respective model for each of the monitoring techniques. For example, (i) based on features extracted from the users' network traffic, the processor may learn a first model that maps such features to a characteristic vector;
(ii) based on features extracted by a software agent from the users' devices, the processor may learn a second model that maps such features to a characteristic vector; and
(iii) based on features extracted from the users' answers to a questionnaire, the processor may learn a third model that maps such features to a characteristic vector.

Next, at a vector-computing step 50, the processor uses each of the models to compute respective characteristic vectors for one or more users. Subsequently, at a convergence-checking step 52, the processor checks if the characteristic vectors converge. For example, the processor may ascertain if, for any given user, the models return respective characteristic vectors that are within a suitable threshold of similarity of each other. If the vectors do not yet converge, the processor refines one or more of the models at a model-refining step 54, and then returns to vector-computing step 50.

By way of example, it will be assumed that the three models produce, respectively, the following three characteristic vectors for a given user (assuming, for simplicity, only five coefficients per characteristic vector): (i) (3, 2, 0, 1, 4), (ii) (3.1, 1.9, 0.1, 1.2, 3.8), and (iii) (3, 2.1, 0, 1.1, 4.1). These vectors may be determined, by the processor, to be within a suitable similarity threshold of each other, given the closeness of the coefficient values across the three vectors. (For example, the first coefficient does not vary, between the three vectors, by more than 0.1.) In contrast, if the third vector were to have the value (5, 7, 3, 2, 6), the processor may determine that the vectors do not yet converge.

Typically, upon the vectors converging, the processor next tests, for accuracy, the model of interest. For example, if the processor will be using the network-traffic-monitoring technique, the processor tests, for accuracy, the model that was derived from the network-traffic features. (This test effectively checks for any bias in the model; the model may agree with the other models, but all of the models may be biased.) To test the model, the processor (or a human operator of the system) performs one or more simulated attacks, at a simulated-attacking step 56, on a plurality of users, and also scores these users, using the users' characteristic vectors, with respect to the respective types of simulated attacks. Next, at a correlation-checking step 58, the processor checks the degree to which the users' responses to the simulated attacks correlate with the scores. For example, for each type of simulated attack, the processor may divide the users into several groups, based on the users' scores, and calculate, for each group, the percentage of "passes"—i.e., the percentage of users who did not succumb to the simulated attack. If the percentage of passes is generally correlated with the scores, the model is deemed to be accurate, and the calibration therefore ends. Otherwise, the processor returns to model-refining step 54.

By way of example, Table 1 below shows (fictitious) data that reflect a relatively high correlation between users' responses and the users' scores, in that the pass percentages generally increase in proportion to the increase in scores. (It is assumed that a higher score indicates a higher level of awareness.)

TABLE 1

| Group | Range of scores | Percentage of passes |
| --- | --- | --- |
| 1 | 2.8-3.8 | 30% |
| 2 | 3.9-4.9 | 42% |
| 3 | 5-6 | 53% |
| 4 | 6.1-7.1 | 62% |
| 5 | 7.2-8.1 | 74% |

In contrast, Table 2 below shows (fictitious) data that reflect a relatively low correlation.

TABLE 2

| Group | Range of scores | Percentage of passes |
|---|---|---|
| 1 | 2.8-3.8 | 50% |
| 2 | 3.9-4.9 | 22% |
| 3 | 5-6 | 25% |
| 4 | 6.1-7.1 | 15% |
| 5 | 7.2-8.1 | 33% |

Over time, the properties of the network traffic, and/or the behavior of users, may evolve. Such changes may render a previously-calibrated mapping inaccurate. The processor is, therefore, typically configured to periodically recalibrate the mapping, and/or recalibrate the mapping in response to an identified degradation in the accuracy of the computed scores. Such a recalibration may also allow the processor to take advantage of any new learning data that become available.

Other Embodiments

In some embodiments, the processor applies, to a group of users, the model that will be used for scoring, and then clusters the users according to the characteristic vectors produced by the model. An expert may then label each cluster. Subsequently, each targeted user may be associated with one of the labeled clusters. An advantage of this approach is that it may not be necessary to perform the above-described calibration technique, since there is no need to "normalize" any coefficient or score values.

For example, based on the characteristic vectors produced by the model, the processor may define three clusters of users, which may be respectively labeled, by an expert, as a "low awareness" cluster, a "medium awareness" cluster, and a "high awareness" cluster. Subsequently, a targeted user may be associated with one of the clusters, based on the user's characteristic vector.

In some embodiments, further to scoring a plurality of users, the processor uses the assigned scores to identify "new" features that may be used, for example, to facilitate subsequent scoring. Such new features may include common usage patterns among users with similar scores. For example, the processor may identify that users with poor awareness scores generally use a particular application that is not generally used by users with higher awareness scores. In response thereto, usage of this particular application may be used as a feature for scoring other users, or for rescoring users that used the application. Alternatively or additionally, the application may be classified as malware (e.g., following an assessment by an expert), and users may be warned not to use this application.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a monitoring agent, configured to automatically monitor usage of a computing device by a user; and
a processor, configured:
to receive an input that includes a type of cyber-security attack,
to compute a characteristic vector of coefficients of the user, each of which quantifies competence of the user in a different one of a plurality of cyber-security areas based on the monitored usage of the computing device by the user;
to compute, based on the characteristic vector of coefficients, a score quantifying a cyber-security awareness of the user with respect to the type of attack; and
to generate an output indicative of the score.

2. The system according to claim 1, wherein the monitoring agent comprises a network probe configured to monitor the usage of the computing device by monitoring network traffic exchanged with the computing device.

3. The system according to claim 1, wherein the monitoring agent comprises a software agent installed on the computing device.

4. The system according to claim 1, wherein the processor is configured to compute the score by:
recommending a simulated cyber-security attack, and
computing the score based on a response of the user to the simulated attack.

5. The system according to claim 1, wherein the processor is further configured to receive an input that includes a type of cyber-security attack.

6. The system according to claim 5, wherein the processor is configured to compute the score by:
computing, based on the monitoring, a characteristic vector of coefficients, each of which quantifies competence of the user in a different respective one of a plurality of cyber-security areas, and
computing the score, based on the characteristic vector of coefficients, and respective weightings of each of the coefficients with respect to the type of attack.

7. The system according to claim 6, wherein the processor is configured to compute the score by computing, using the weightings, a weighted sum of the coefficients.

8. The system according to claim 1, wherein the processor is configured to use a machine-learned model to compute the characteristic vector of coefficients.

9. A method, comprising:
receiving an input that includes a type of cyber-security attack;
using a monitoring agent, automatically monitoring usage of a computing device by a user;
computing a characteristic vector of coefficients of the user, each of which quantifies competence of the user in a different one of a plurality of cyber-security areas based on the monitored usage of the computing device by the user;
based on the characteristic vector of coefficients, computing a score indicative of a cyber-security awareness of the user with respect to a type of attack; and
generating an output indicative of the score.

10. The method according to claim 9, wherein monitoring the usage of the computing device comprises monitoring the usage of the computing device by monitoring network traffic exchanged with the computing device.

11. The method according to claim 9, wherein the monitoring agent includes a software agent installed on the computing device.

12. The method according to claim 9, wherein computing the score comprises:
recommending a simulated cyber-security attack, and
computing the score, based on a response of the user to the simulated attack.

13. The method according to claim 9, further comprising receiving an input that includes a type of cyber-security attack.

14. The method according to claim 13, wherein computing the score comprises:
computing, based on the monitoring, a characteristic vector of coefficients, each of which quantifies competence of the user in a different respective one of a plurality of cyber-security areas, and
computing the score, based on the characteristic vector of coefficients, and respective weightings of each of the coefficients with respect to the type of attack.

15. The method according to claim 14, wherein computing the score comprises computing the score by computing, using the weightings, a weighted sum of the coefficients.

16. The method according to claim 9, wherein computing the characteristic vector of coefficients comprises using a machine-learned model to compute the characteristic vector of coefficients.

17. The method according to claim 9, wherein computing the characteristic vector of coefficients comprises computing the characteristic vector of coefficients by mapping a plurality of features, obtained from the monitoring, to the coefficients.

18. The method according to claim 17, further comprising, prior to computing the characteristic vector:
using the monitoring agent, by monitoring at least one user, obtaining a first plurality of features,
by monitoring the at least one user using a monitoring technique that is not used by the monitoring agent, obtaining a second plurality of features, and
calibrating the mapping such that a characteristic vector of coefficients mapped from the first plurality of features is within a threshold of similarity of a characteristic vector of coefficients mapped from the second plurality of features.

19. The method according to claim 17, further comprising, prior to computing the characteristic vector, calibrating the mapping, by:
using characteristic vectors of coefficients obtained from the mapping, computing respective scores, for a plurality of users, that indicate awareness of the users with respect to a particular type of cyber-security attack, and
checking a correlation between the scores and respective responses of the users to a simulated attack of the particular type.

* * * * *